March 12, 1957     E. J. FREY     2,785,132
DOMESTIC APPLIANCE

Filed May 5, 1953     2 Sheets-Sheet 1

INVENTOR.
Edward J. Frey
BY
*Attorney*

United States Patent Office 2,785,132
Patented Mar. 12, 1957

2,785,132

DOMESTIC APPLIANCE

Edward J. Frey, Dayton, Ohio, assignor to General Motors Corporation, Detroit, Mich., a corporation of Delaware Application May 5, 1953, Serial No. 353,065

4 Claims. (Cl. 252—70)

This invention relates to domestic appliances and is more particularly concerned with thermo-sensitive materials for use in controls for said appliances.

It is, therefore, the prime object of the invention to provide a thermo-sensitive material, suitable for use in a thermal control for a domestic appliance, which material has a high rate of expansion within a narrow and desired range of temperatures.

More specifically, another object of the invention is to provide a thermo-sensitive material which is normally in a solid state and which melts at a temperature approximating the desired operating temperature of the device being controlled, whereby the overall expansion of the material at the control temperature is equal to the sum of the thermal expension thereof plus the expansion caused by change in physical state.

In carrying out the above objects, it is another object of the invention to utilize fatty acids normally solid at room temperature for the thermo-sensitive material.

A still further object of the invention is to utilize fatty acids and mixtures thereof which melt in the neighborhood of 100° F.

In carrying out this object, it is another object to utilize fatty acids, such as lauric acid, myristic acid, palmitic acid, stearic acid, etc., and mixtures thereof for the purpose stated.

A more specfic object of the invention is to utilize lauric acid as a preferred material either alone or in combination with other fatty acids.

Further objects and advantages of the present invention will be apparent from the following description, reference being had to the accompanying drawing. wherein preferred embodiments of the present invention are clearly shown.

The thermo-sensitive material disclosed herein may be used in connection with any suitable thermostatic control. Specifically, I have found that such materials are particularly adapted for use in controls for domestic appliances, such as washing machines, wherein the control operates the thermostatic mixing valve, and such as is disclosed in my copending application, Serial No. 353,-064, Edward J. Frey, for Domestic Appliances and filed on May 5, 1953, concurrently herewith. It is apparent that the same materials may be used in any type of control wherein thermo-sensitive material is required and wherein the operation of the control is within that range of temperature wherein the particular materials disclosed are adapted for use.

Figure 2:
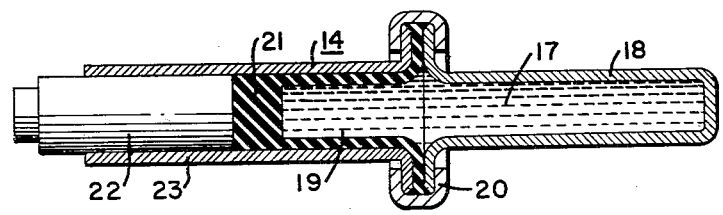
Figure 2 is a cross section of an expansible element usable in a thermostat.
Figure 1:
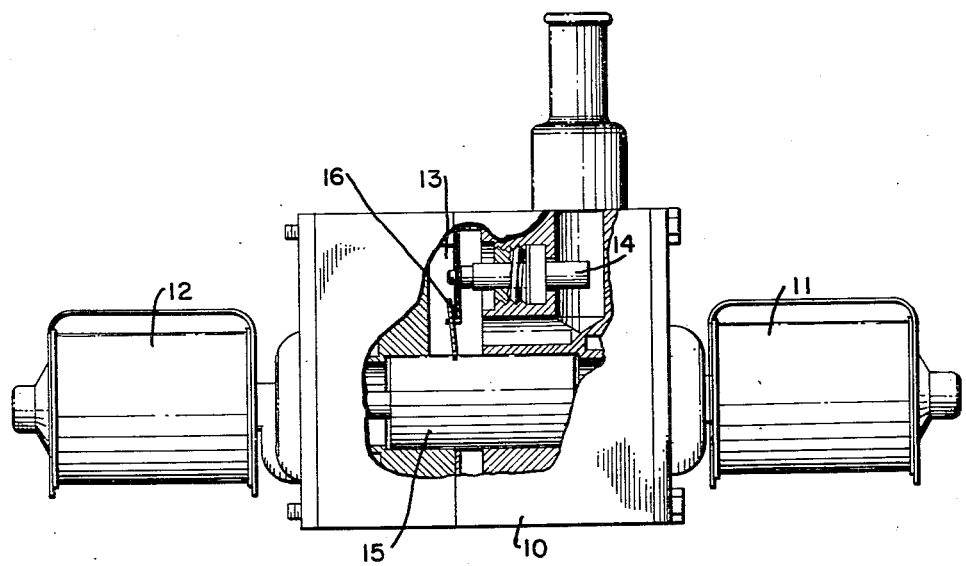
Figure 1 is a diagrammatic elevation of a thermostat which may embody my invention.

For illustrative purposes only, one of such controls is shown in Figure 1 wherein a valve structure 10 may be actuated by solenoids 11 and 12 to open hot and cold water valves which feed into a mixing chamber 13 adjacent to which a thermostatic element 14 may be placed. This element is adapted to actuate a controlling structure 15 to vary the proportions of hot and cold water, this controlling structure 15 being actuated by any suitable linkage 16.

The thermostatic element 14 may be made expansible in any suitable form. For example, a chamber 17 may be surrounded by a metallic cylindrical cup 18 of relatively fixed construction and a flexible cylindrical cup 19, the two cups being secured together by a ring 20. The end 21 of the cup 19 moves a plunger 22 within an open-ended cylinder 23, the plunger 22 in turn moving the linkage 16.

The foregoing structural details are all given by way of example, it being understood that many other structures may be substituted therefor.

The material to be used within the chamber 17 is preferably chosen from that class of fatty acids which are normally solid at room temperature and which melt or change physical state at temperatures in the neighborhood of 100° F. These materials have a marked degree of thermal expansion at about 100° F. and this large degree of expansion contributes to the success of my invention.

Figure 3:
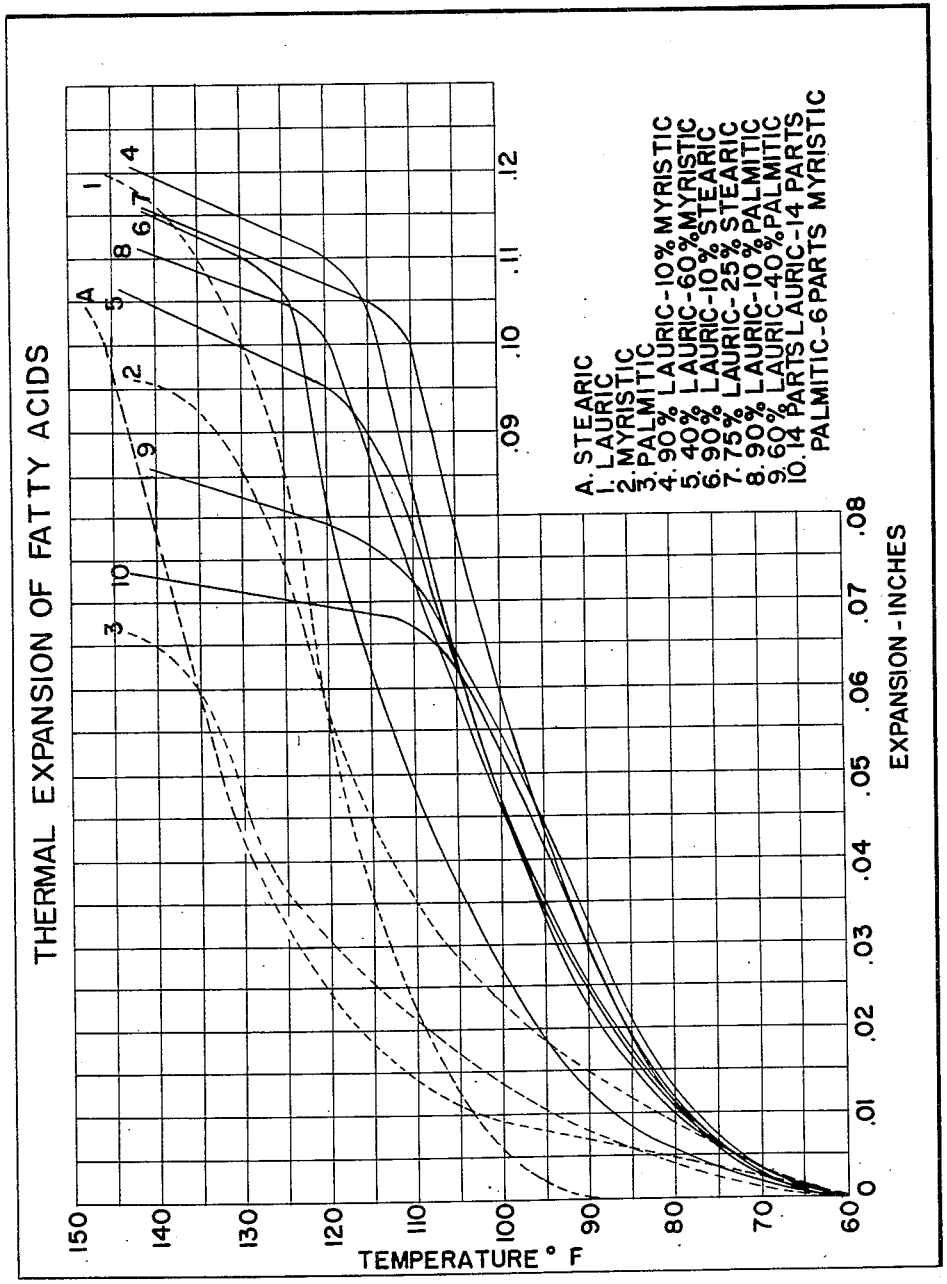
Figure 3 is a chart showing a family of expansion curves of preferred materials.

Referring to Fig. 3, a family of expansion curves of various fatty acids and mixtures thereof is shown. The curves are numbered and the ingredients used in obtaining the curves are noted on the drawing. It may be seen that curves numbered 4, 5 and 7 show the greatest degree of expansion between 90° and 110° F. with the rate of expansion falling off rapidly below 90° and above 110° F. The other curves, while following a somewhat similar pattern, do not have as wide a temperature range. However, it has been found that all of these materials will function in a satisfactory manner, although it is apparent that those materials which give the greatest spread in temperature are generally most desirable.

It will be noted the table of Figure 3 includes the following components:

A. Stearic
1. Lauric
2. Myristic
3. Palmitic
4. 90% lauric—10% myristic
5. 40% lauric—60% myristic
6. 90° lauric—10% stearic
7. 75% lauric—25% stearic
8. 90% lauric—10% palmitic
9. 60% lauric—40% palmitic
10. 14 parts lauric—14 parts palmitic—6 parts myristic The curves representing the components A, 1, 2 and 3 are shown as dotted lines and it can be seen that each of these curves represents a relatively small expansion in inches between the temperatures of 90° F. and 110° F. compared with the solid lines representing components 4, 5, 6, 7, 8, 9 and 10 as indicated by the table. The curves represented by the solid lines show that by compounding the components it is possible to get an appreciably greater expansion in inches or flatness in the curves between the temperatures of 90° F. and 110° F. peculiarly suitable to the needs for use in accordance with the objects of the present invention.

The large expansion of these particular materials is attributed to the fact that the total expansion is equal to the sum of the normal thermal expansion of the material due to its coefficient of expansion plus the expansion occasioned by change in physical state due to the melting of the material. When added together, it has been found that in connection with the preferred materials, expansion is in the order of .004" per inch per degree F. and above is obtained within the range of 90° to 110° F. Such an expansion gives adequate movement of the plunger element 22 to actuate the linkage 16.

It is apparent that in place of fatty acids, certain other organic acids, salts and esters may be used for the same purpose either alone or in combination, although the particular materials noted herein are preferred due to their extremely active expansion characteristics within the desired operating range.

While the embodiments of the present invention as herein disclosed constitute preferred forms, it is to be understood that other forms might be adopted, as may come within the scope of the claims which follow.

What is claimed is as follows:

1. A thermo-responsive device, comprising, in combination; an expansible element capable of operating said device and a thermo-responsive material within said element having a thermo expansion in the order of .004 of an inch per inch within a melting range of 90° F. and 110° F., said thermo-responsive material consisting essentially of lauric acid in quantities of between 40% and 90% by weight, the remainder of said material being at least one of the fatty acids taken from the class consisting of myristic, palmitic and stearic acids.

2. The thermo-responsive device claimed in claim 1 wherein the lauric acid is present in quantities of 90% and the fatty acid is myristic acid in quantities of about 10%.

3. The thermo-responsive device claimed in claim 1 wherein the lauric acid is present in quantities of 40% and the fatty acid is myristic acid in quantities of about 60%.

4. The thermo-responsve device claimed in claim 1 wherein the lauric acid is present in quantities of 75% and the fatty acid is myristic acid in quantities of about 25%.

References Cited in the file of this patent

UNITED STATES PATENTS

| | | |
|---|---|---|
| 2,259,846 | Vernet et al. | Oct. 21, 1941 |
| 2,593,238 | Albright | Apr. 15, 1952 |

FOREIGN PATENTS

| | | |
|---|---|---|
| 436,836 | Great Britain | Oct. 18, 1935 |

OTHER REFERENCES

Oil and Soap, vol. 16, No. 11, November 1939, pp. 209–212.